(12) United States Patent
Hosotani et al.

(10) Patent No.: US 6,590,790 B2
(45) Date of Patent: Jul. 8, 2003

(54) SWITCHING POWER SUPPLY DEVICE

(75) Inventors: Tatsuya Hosotani, Muko (JP);
Tomohiro Yamada, Nagaokakyo (JP);
Kentaro Takahashi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 09/977,914

(22) Filed: Oct. 9, 2001

(65) Prior Publication Data

US 2002/0067627 A1 Jun. 6, 2002

(30) Foreign Application Priority Data

Oct. 11, 2000 (JP) .......................................... 2000-310876

(51) Int. Cl.$^7$ ............................................. H02M 3/335
(52) U.S. Cl. ...................... 363/21.16; 363/97; 363/131; 363/21.08
(58) Field of Search ............................. 363/17, 21.02, 363/21.16, 22–25, 97, 133, 134, 21.08, 131

(56) References Cited

U.S. PATENT DOCUMENTS

| | | | | |
|---|---|---|---|---|
| 4,550,359 A | * | 10/1985 | West | 361/56 |
| 5,168,435 A | * | 12/1992 | Kobayashi et al. | 363/20 |
| 5,805,432 A | * | 9/1998 | Zaitsu et al. | 363/16 |
| 6,061,252 A | * | 5/2000 | Hosotani | 363/16 |
| 6,359,795 B1 | * | 3/2002 | Amantea et al. | 363/21.01 |

* cited by examiner

Primary Examiner—Michael Sherry
Assistant Examiner—Gary L. Laxton
(74) Attorney, Agent, or Firm—Keating & Bennett, LLP

(57) ABSTRACT

A switching power supply device in which a transformer, a first switch circuit, and an input power source are connected in series. A series circuit formed of a second switch circuit and a capacitor is connected to one end of the first switch circuit. The transformer has a driving winding which is wound in the same direction as that of the primary winding of the transformer. A capacitive impedance element including a series circuit formed of a capacitor and an inductive ferrite bead, is connected between the termination of the driving winding and the input power source. The switching power supply device uses a less capacitive impedance and thus provides higher radiation noise reduction performance, thereby preventing switching devices from being damaged due to high voltage increase rate of the switching devices.

15 Claims, 5 Drawing Sheets

SWITCHING POWER SUPPLY DEVICE

BACKGROUND OF THE INVENTION

1. Field of the Invention

The present invention relates to a switching power supply device which achieves noise reduction during switching.

2. Description of the Related Art

In a switching power supply device having a switching device connected to the primary of a transformer, such that the switching device is used for a self-excited or separately-excited oscillation to provide an output from the secondary of the transformer, a pulsed voltage across the switching device is provided when the switching device is turned on and off, and noise is radiated externally when the pulse increases and decreases. Radiation noise having a predetermined level or higher of radiation energy might adversely affect external devices, and must be reduced by some technique. A conventional method of effectively reducing the radiation noise is to connect capacitors across both ends of the switching device so as to mitigate a rapid change of the voltage so that high frequency noise components may be eliminated.

FIG. 1 illustrates a conventional switching power supply device of this type, to which capacitors are connected.

In the switching power supply device shown in FIG. 1, a transformer T having the primary winding $N_p$ and the secondary winding $N_s$ is connected in series to a first switch circuit S1 and an input power source E. One end of a series circuit comprising a second switch circuit S2 and a capacitor C is connected to one end of the first switch circuit S1. A rectifier smoothing circuit is connected to the secondary winding $N_s$ of the transformer T. The switching power supply device is a self-excited oscillation device. The details of the switching power supply device shown in FIG. 1 are disclosed in Japanese Unexamined Patent Application Publication No. 11-187664. In the switching power supply device disclosed, the first switch circuit S1 includes a first switching device Q1 and a capacitor $C_1$ which are connected in parallel to each other, and the second switch circuit S2 includes a second switching device Q2 and a capacitor $C_2$ which are connected in parallel to each other. The capacitors $C_1$ and $C_2$ allow a rapid change of the voltages generated across the first and second switching devices Q1 and Q2, respectively, to be mitigated, so that high frequency noise components may be eliminated.

However, in the switching power supply device shown in FIG. 1, the capacitors $C_1$ and $C_2$ must have a high voltage rating. Furthermore, the capacitance of the capacitors $C_1$ and $C_2$ must be a predetermined level or higher in order to constantly reduce the radiation noise. Therefore, a problem occurs in that the capacitors $C_1$ and $C_2$ are so large that a compact and low cost switching power supply device may not be achieved.

SUMMARY OF THE INVENTION

Accordingly, it is an object of the present invention to provide a switching power supply device which uses a less capacitive impedance to provide higher radiation noise reduction performance.

To this end, the switching power supply device includes a transformer having primary and secondary windings, a first switch circuit, an input power source, a second switch circuit, and a rectifier smoothing circuit connected to the second winding of the transformer. The transformer, the first switch circuit, and the input power source are connected in series. The second switch circuit and a capacitor are connected in series to form a series circuit, and one end of the series circuit is connected to one end of the first switch circuit. The first switch circuit includes a parallel connection circuit comprising a first switching device and a first diode, and the second switch circuit includes a parallel connection circuit comprising a second switching device and a second diode. The switching power supply device further includes a switching control circuit for controlling each of the first and second switching devices so as to be alternately turned on and off with an off-time interposed between on-times. The transformer further has a third winding wound in the same direction as that of the primary winding, and a capacitive impedance element is connected between the termination of the third winding and the input power source.

In FIG. 1, if the primary winding $N_p$ of the transformer T has an inductance $L_p$, the resonant frequency $f_r$ while the voltage across the first switching device Q1 varies is found by equation (1) as follows:

$$f_r = \frac{1}{2\pi\sqrt{L_p C_1}} \quad (1)$$

where the parasitic capacitance of the first switching device Q1 is negligible.

From equation (1), as the capacitance of the capacitor $C_1$ increases, the resonant frequency $f_r$ decreases, and high frequency noise components are reduced.

On the other hand, as shown in FIG. 2, in a power supply device according to the present invention, a transformer T includes a third winding (in FIG. 2, a second driving winding $N_{b2}$ having turns a turn $Nb_2$ corresponds to the third winding) which is wound in the same direction as that of the primary winding $N_p$ (having turns $N_p$). A capacitive impedance element Ca is connected between the termination of the third winding and an input power source E, so that the capacitors $C_1$ and $C_2$ shown in FIG. 1 may be removed, or, otherwise, may have lower capacitances. If the capacitive impedance is indicated by $C_a$, and the inductance of the third winding is indicated by $L_a$, the resonant frequency $f_r$ while the voltage across the first switching device Q1 varies is found by equation (2) as follows.

$$f_r = \frac{1}{2\pi\sqrt{(L_p + L_a)C_a}} \quad (2)$$

It is understood from comparison between equations (1) and (2) that the capacitor $C_a$ can be more compact than the capacitor $C_1$ if the resonant frequencies $f_r$ are the same. Therefore, according to the present invention, a capacitive impedance element is connected between the termination of a third winding and an input power source so that the radiation noise caused by a rapid change of the voltage across a switching device can be reduced. This allows the capacitive impedance to be lower, thereby achieving a compact and low-cost switching power supply device.

Preferably, the capacitive impedance element includes a series circuit comprising a capacitor and an inductor.

This prevents a current from rapidly flowing into the capacitor, thereby achieving noise reduction.

The inductor may be a ferrite bead. A compact and low-cost ferrite bead would prevent a current which rapidly flows into the capacitor, in particular, a high frequency current, thereby achieving noise reduction.

Preferably, a voltage generated at the third winding is used to turn on the second switching device. If a driving winding for allowing the second switching device to be turned on is used as the third winding, the transformer may be more compact.

At least one of the first and second switching devices may be a field effect transistor. Therefore, the parasitic diode of the field effect transistor can be used instead of the first and/or second diode. In this case, the first and/or second diode may be removed, thereby making the switching power supply device more compact and light-weight.

Preferably, the transformer includes a driving winding which allows a voltage to turn on the first switching device to be generated to provide self-excited oscillation. Therefore, there is no need for ICs such as oscillation circuits and control circuits, thereby achieving a compact, light-weight, and low-cost switching power supply device.

The transformer may include either a leakage inductor connected between the primary and secondary windings, or an inductor connected in series to the transformer. The resulting inductor and the capacitor form a resonant circuit.

The resonance by the inductor and the capacitor allows the energy accumulated in the inductor to be output without being dissipated, thereby providing high efficiency. Furthermore, the second switching device can perform a zero current turn-off operation, thereby reducing switching loss.

Preferably, the rectifier smoothing circuit includes a diode for rectifying an output of the secondary winding, and a capacitive impedance element connected in parallel to this diode.

The capacitive impedance element connected in parallel to the diode reduces the reverse recovery loss in the diode, thereby providing high efficiency.

The rectifier smoothing circuit may allow energy to be accumulated in the primary winding of the transformer while the first switching device is turned on, and allow the energy to be supplied from the secondary winding of the transformer while the first switching device is turned off.

Therefore, at least one secondary diode connected to the secondary winding of the transformer is only required, thereby achieving a compact, light-weight, and low-cost switching power supply device. However, at least two diodes are necessary if a circuit for rectifying an output at the secondary both while the first switching device is turned on and off is provided.

Accordingly, a more compact capacitor is used to reduce noise which is constantly radiated, and less stress caused by a voltage fluctuation is imposed on the switching device, thereby achieving a compact and low-cost switching power supply device.

BRIEF DESCRIPTION OF THE DRAWING(S)

DETAILED DESCRIPTION OF EMBODIMENTS OF THE INVENTION

Figure 2:
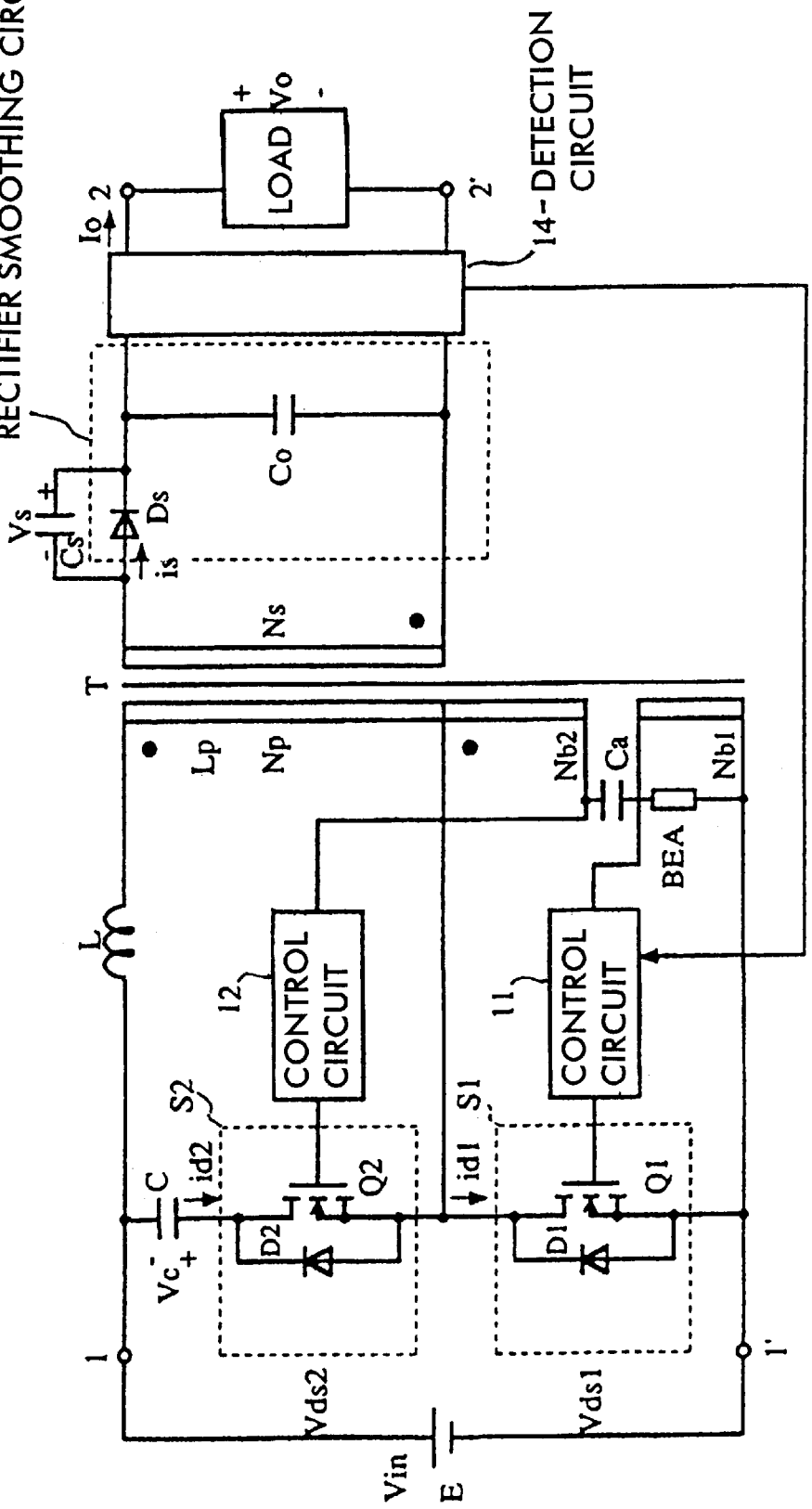
FIG. 2 is a circuit diagram of a switching power supply device according to one embodiment of the present invention.

FIG. 2 is a circuit diagram of a switching power supply device according to an embodiment of the present invention.

A transformer T includes a the primary winding $N_p$ having turns $N_p$, a secondary winding $N_s$ having turns $N_s$, a driving winding $N_{b1}$ having turns $N_{b1}$, and another driving winding $N_{b2}$ having turns $N_{b2}$. The primary winding $N_p$ is connected in series to an inductor L, a first switch circuit S1, and an input power source E. The inductor L may be a leakage inductor in the transformer T, and the input power source E may be formed by rectifying and smoothing an input AC voltage. A second switch S2 is connected in series with a capacitor C to form a series circuit. This series circuit has one end connected to one end of the first switch circuit S1, and the other end connected to a node between the input power source E and the inductor L.

The first switch circuit S1 includes a field effect transistor Q1 (hereinafter referred to as "FET Q1"), which corresponds to a first switching device, and a first diode D1 connected in parallel thereto. The second switch circuit S2 includes a field effect transistor Q2 (hereinafter referred to as "FET Q2"), which corresponds to a second switching device, and a second diode D2 connected in parallel thereto. A control circuit 11 for controlling when the FET Q1 is to be turned on and off is connected between the driving winding $N_{b1}$ and the FET Q1. A control circuit 12 for controlling when the FET Q2 is to be turned on and off is connected between the driving winding $N_{b2}$ and the FET Q2. The control circuits 11 and 12 alternately turn on and off the FETs Q1 and Q2 before and after periods during which FETS Q1 and Q2 are both turned off.

A rectifier smoothing circuit which includes a rectifier diode Ds and a smoothing capacitor $C_O$ is connected to the secondary winding $N_s$. The diode Ds is connected in parallel to a capacitor $C_s$ which is a capacitive impedance element. A detection circuit 14 for detecting an output voltage is connected at the output side of the rectifier smoothing circuit, and detected signals are fed back to the control circuit 11. The detection circuit 14, which may be a well-known circuit including a photo coupler, feeds back the detected signals to the control circuit 11.

In the switching power supply device according to the illustrated embodiment, a capacitive impedance element which includes a series circuit comprising a capacitor $C_a$ and a ferrite bead BEA having an inductance component is connected between the termination of the driving winding $N_{b2}$ and the input power source E.

The operation of the switching power supply device will now be described.

When the first switching device Q1 is turned on, an input voltage Vin is applied to the primary winding $N_p$ to allow a current to flow, and energy is accumulated in the transformer T. When the first switching device Q1 is turned off, the voltage of the primary winding $N_p$ of the transformer T is inverted to produce a resonance by the inductor L and the capacitor C at the primary side. At the secondary side, the energy accumulated in the transformer T is supplied as a current from the secondary winding $N_s$. The operation at the primary side is now described in detail.

When the first switching device Q1 is turned off, the energy accumulated in the inductor L is supplied to the right, as viewed in FIG. 2, i.e., to the primary winding $N_p$, a parallel circuit comprising the parasitic capacitance of the FET Q2 and the diode D2, and the capacitor C, and becomes a charged current in the capacitor C. At this time, the energy in the inductor L is absorbed by the capacitor C, and a surge is not produced by the inductor L. The charged current in the capacitor C serves to discharge inverse charges of the parasitic capacitance of the FET Q2, and, after the charges of the parasitic capacitance have been discharged, the diode D2 (or the parasitic diode of the FET Q2 if the diode D2 is not connected) conducts. The voltage of the driving winding $N_{b2}$ is delayed by the control circuit 12 that includes a delay circuit including a series circuit comprising a resistor and a capacitor, and is then applied to a control terminal (gate terminal) of the FET Q2, so that the FET Q2 is turned on with some delay after the FET Q1 is turned off. Turning on the FET Q2 while the diode D2 conducts leads to a zero voltage switching. The zero voltage switching greatly reduces the switching loss of the FET Q2.

When the FET Q2 is turned on, a discharge current flows according to the potential charged in the capacitor C. The discharge current allows energy to be accumulated in the inductor L and the primary winding $N_p$. The discharge current becomes a resonance current of the capacitor C and the inductor L, and an increase of the resonance current is extremely modest. As a result, an output current of the secondary winding $N_s$ forms a portion of a sinusoidal waveform (hilltop-shaped waveform) in which the current increases from zero, and a surge current is not substantially produced when the secondary winding current increases.

Figure 3:
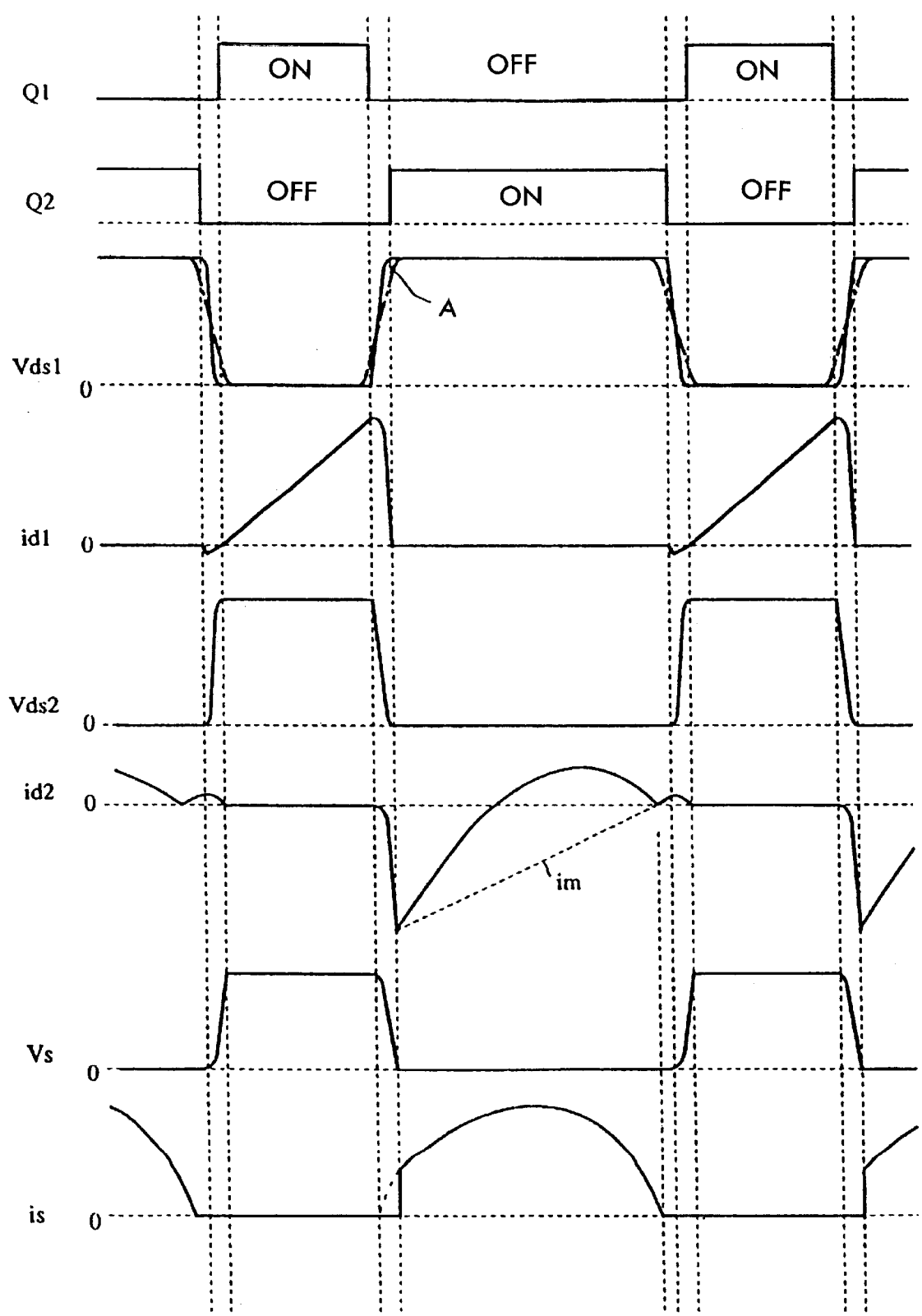
FIG. 3 is an operating waveform of the embodiment of the present invention.

As a predetermined time determined by a an RC time constant circuit contained in the control circuit 12 elapses since the FET Q2 is turned on, transistors contained in the control circuit 12 are turned on, and the FET Q2 is turned off. Then, the energy accumulated in the inductor L and the primary winding $N_p$ is supplied as a current which flows to the left, as viewed in FIG. 2, flowing through the input power source E the parallel circuit comprising the parasitic capacitance of the FET Q1 and the diode D1, and the primary winding $N_p$. This current causes charges of the parasitic capacitance of the FET Q1 to be discharged. When the discharging terminates, the voltage across the diode D1 (or the parasitic diode of the FET Q1 if the diode D1 is not connected) goes to zero so that the diode D1 conducts. Since the FET Q2 is turned off, the voltage generated in the driving winding $N_{b1}$ is delayed by the control circuit 11 that includes a delay circuit including a series circuit comprising a resistor and a capacitor, and is then applied to a control terminal (gate terminal) of the FET Q1. In this timing, the voltage across the diode D1 is zero, and the FET Q1 performs a zero voltage switching operation. When the FET Q1 is turned on in the zero voltage switching operation, energy is again accumulated in the inductor L and the primary winding $N_p$. FIG. 3 shows operating waveforms of the circuit shown in FIG. 2. In FIGS. 2 and 3, "$V_{ds1}$" and "$V_{ds2}$" represent a source-drain voltage of the FET Q1 and a source-drain voltage of the FET Q2, respectively, "$i_{d1}$" and "$i_{d2}$" represent currents which flow into the FETs Q1 and Q2, respectively, and "$i_s$" represents a secondary winding current.

Accordingly, the FETs Q1 and Q2 are alternately turned on and off before and after periods during which the FETs Q1 and Q2 are both turned off. The switching devices Q1 and Q2 perform zero voltage switching. The waveform of the secondary winding current is a portion of a sinusoidal waveform (hilltop-shaped waveform) in which the current increases from zero. Therefore, switching loss is greatly reduced, while a surge is prevented.

Furthermore, in the switching power supply device, radiation noise which is caused by a rapid change of the voltage across the FET Q1 is reduced by the capacitor $C_a$. If the driving winding $N_{b2}$ (third winding) which is wound in the same direction as that of the primary winding $N_p$ has an inductance $L_a$, the resonant frequency $f_r$ while the voltage across the FET Q1 varies is found by equation (3) as follows:

$$f_r = \frac{1}{2\pi\sqrt{(L_p + L_a)C_a}} \quad (3)$$

Figure 1:
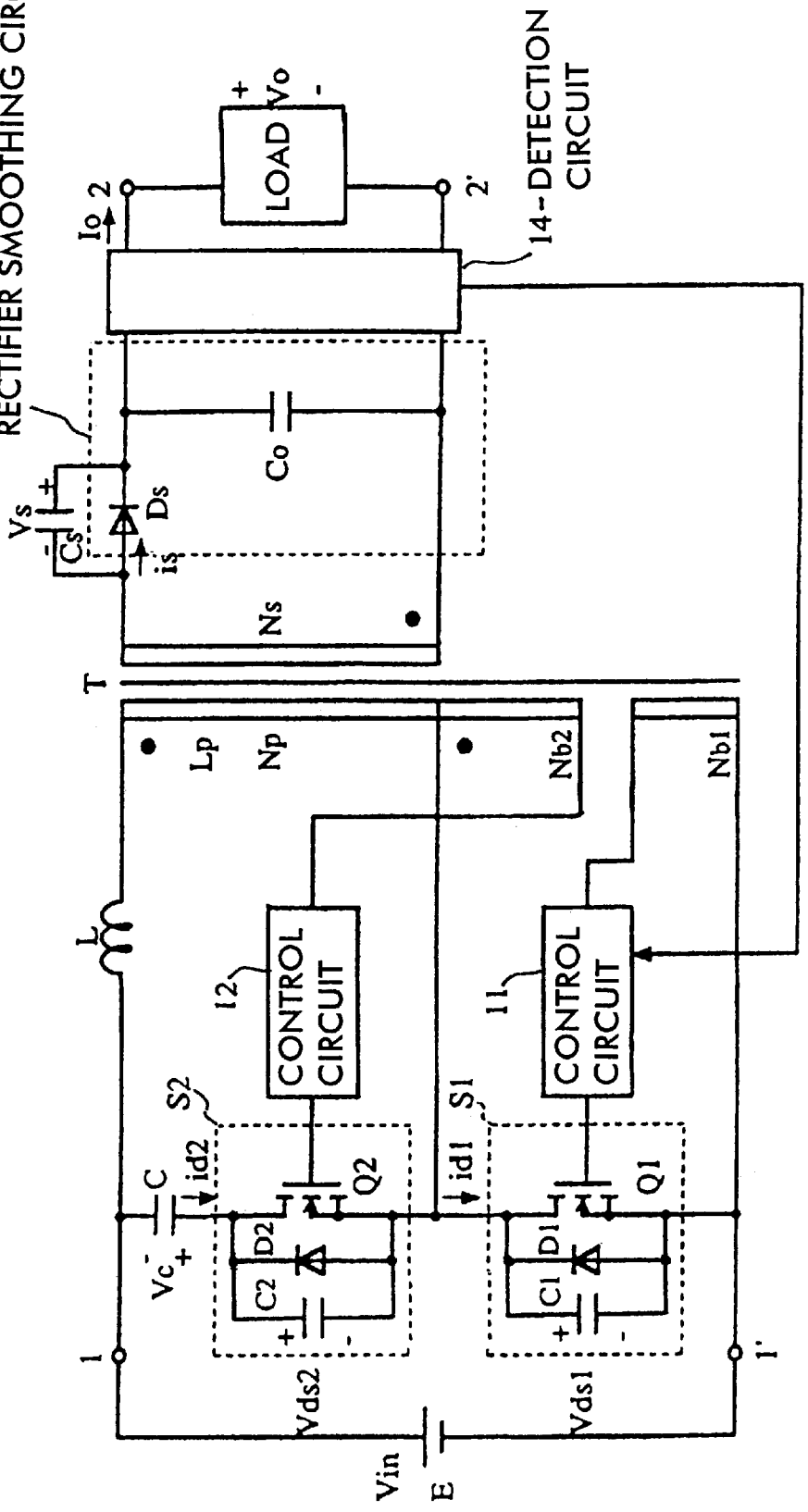
FIG. 1 is a circuit diagram of a conventional switching power supply device.

As the capacitance of the capacitor $C_a$ increases, the resonant frequency $f_r$ decreases, and high frequency noise components, or radiation noise, are reduced. The inductance component in the denominator of equation (3) is indicated by ($L_p+L_a$). In the circuitry shown in FIG. 1, in which the capacitor $C_1$ is connected in parallel to the FET Q1 to achieve radiation noise reduction, the resonant frequency $f_r$ is found by equation (1). Therefore, if the resonant frequencies $f_r$ of the power supply devices shown in FIGS. 1 and 2 are the same, the capacitor $C_a$ shown in FIG. 2 may have less capacitance than that of the capacitor $C_1$ shown in FIG. 1. The capacitors $C_1$ and $C_a$ are capable of absorbing electrostatic energies W' and W, respectively, which are expressed as follows:

$$W' = \frac{1}{2}C_1\left(Vin + \frac{N_p}{N_s}V_0\right)^2, \quad W = \frac{1}{2}C_a\left(Vin + \frac{N_p + N_{b2}}{N_s}V_0\right)^2 \quad (4)$$

From equation (4), it is clear that the capacitor $C_a$ requires less capacitance if the electrostatic energies W' and W capable of being absorbed by the capacitors $C_1$ and $C_2$ are the same. Therefore, according to the illustrated embodiment in FIG. 2, the capacitor $C_a$ may have less capacitance than that of the capacitor $C_1$ in order to reduce a constant level of radiation noise. The switching power supply device can thus be more compact and lower in cost. If the capacitor $C_a$ having the same capacitance as that of the capacitor $C_1$ is connected as indicated by a broken line A in FIG. 3, the voltage $V_{ds1}$ across the FET Q1 varies more modestly.

If a current which flows in the primary winding $N_p$ of the transformer T when the voltage $V_{ds1}$ across the FET Q1 varies is indicated by ip, a gradient G identifying a voltage increase rate of the voltage across the FET Q1 is calculated as follows when the capacitor $C_1$ is connected:

$$G = \frac{dV_{ds1}}{dt} = \frac{1}{C}ip \quad (5)$$

On the other hand, when the capacitor $C_a$ is connected, the gradient G is calculated as follows:

$$G = \frac{dV_{ds1}}{dt} = \frac{N_p}{N_p + N_{b2}} \cdot \frac{1}{C_a} \cdot ip \quad (6)$$

If the capacitors $C_1$ and $C_a$ have the same capacitance, it is understood from equations (5) and (6) that the voltage $V_{ds1}$ across the FET Q1 varies more modestly when the capacitor $C_a$ is connected. A high voltage increase rate dV/dt would increase radiation noise, and, in addition, would lead to incorrect operation of the parasitic transistors within the FET Q1, resulting in a current concentration so that the components may be damaged. The capacitor $C_a$ can be used to prevent these problems.

The illustrated embodiment provides further advantages.

Since the capacitive impedance element connected to the driving winding $N_{b2}$ includes a series circuit comprising the capacitor $C_a$ and the ferrite bead BEA, a rapid current which flows into the capacitor $C_a$, in particular, a high frequency current, can be effectively suppressed. Although a third winding connected to the capacitor $C_a$ may be separate from the driving winding $N_{b2}$, the driving winding $N_{b2}$ is used as a third winding in the illustrated embodiment. Therefore, the transformer T can be more compact. In the switching power supply device shown in FIG. 2, the diodes D1 and D2 are connected in parallel to the FETs Q1 and Q2, respectively. However, the diodes D1 and D2 can be removed using the parasitic diodes of the FETs Q1 and Q2, and the switching power supply device can be more compact and light-weight. Since the voltage of the driving winding $N_{b1}$ is applied to the FET Q1 via the control circuit 11 to provide self-excited oscillation, there is no need for ICs such as oscillation circuits and control circuits, thereby making the power supply device more compact, light-weight, and lower in cost. Moreover, since the inductor L and the capacitor C are used to generate resonance, the energy accumulated in the inductor L can be output without being dissipated, thereby providing high efficiency, while the FET Q2 can perform a zero current turn-off operation, thereby reducing a switching loss. Furthermore, since the capacitive impedance element Cs is connected in parallel to the diode Ds of the rectifier smoothing circuit, the reverse recovery loss in the diode Ds can be reduced, thereby providing high efficiency. Advantageously, in the switching power supply device in the illustrated embodiment, the energy is accumulated in the primary winding $N_p$ of the transformer T while the FET Q1 is turned on, and the energy is supplied from the secondary winding $N_s$ of the transformer T while the FET Q1 is turned off, so that a single diode Ds is only required.

Figure 4:
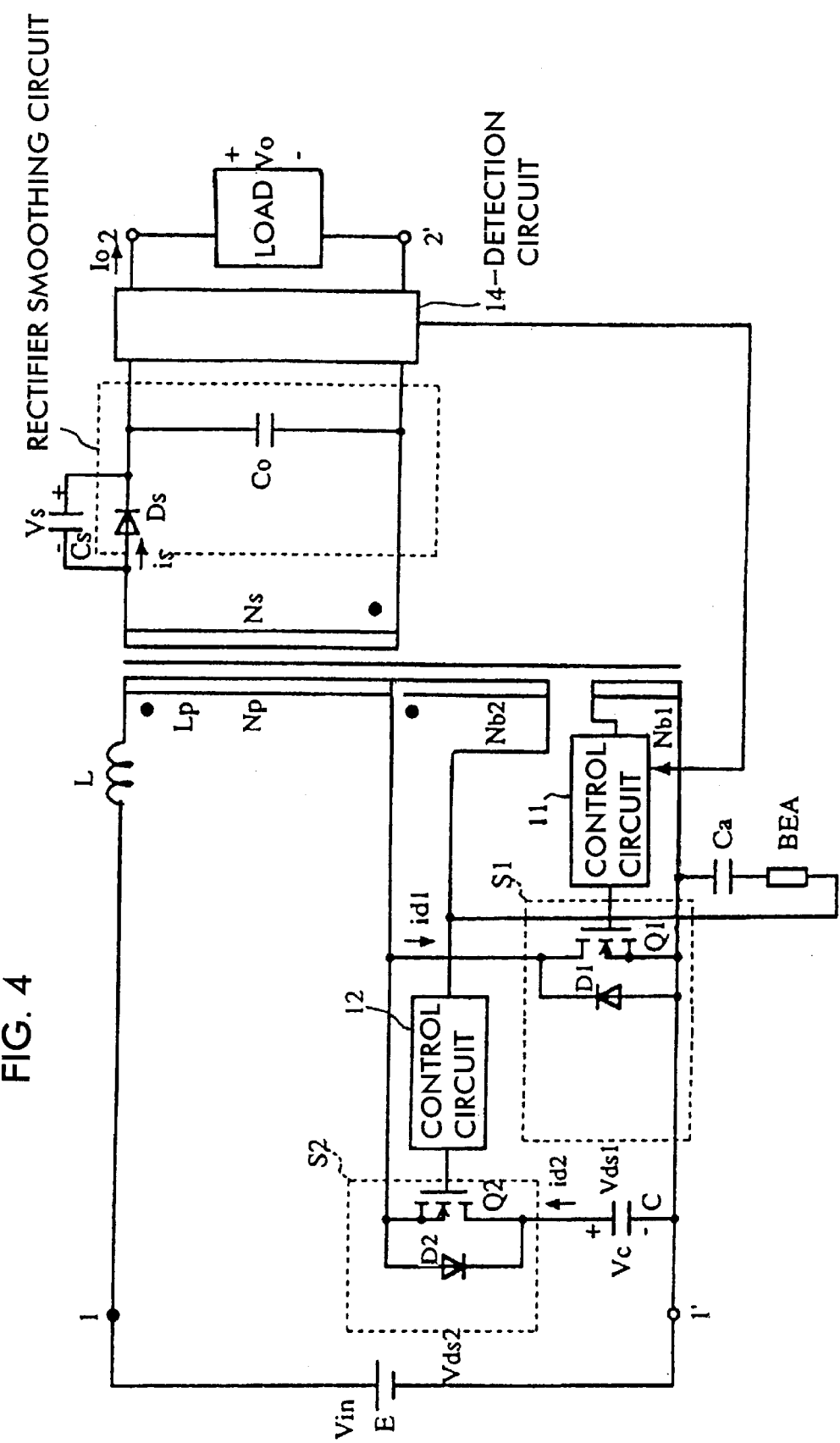
FIG. 4 is a circuit diagram of a switching power supply device according to another embodiment of the present invention.

FIG. 4 is a circuit diagram of a switching power supply device according to another embodiment of the present invention. According to this embodiment, a series circuit comprising the second switch circuit S2 and the capacitor C is connected in parallel to the first switch circuit S1.

Figure 5:
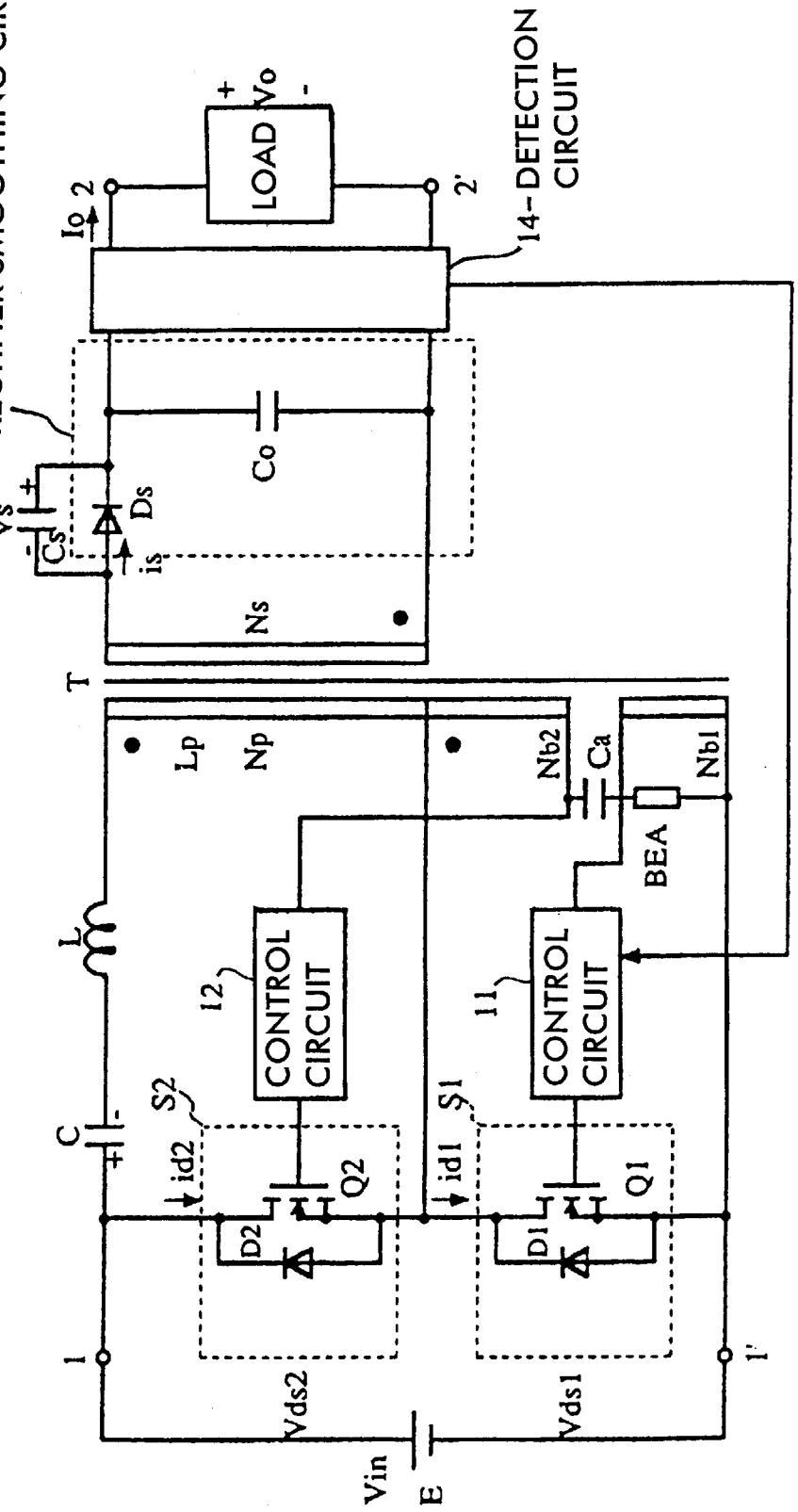
FIG. 5 is a circuit diagram of a switching power supply device according to still another embodiment of the present invention.

FIG. 5 is a circuit diagram of a switching power supply device according to still another embodiment of the present invention. According to this embodiment, the second switching device S2 is connected in parallel to a series circuit comprising the capacitor C, the inductor L, and the primary winding $N_p$. In this embodiment, the energy charged in the capacitor C is also provided to the secondary side of the transformer T, resulting in more efficiency. The voltage applied to both ends of a series circuit of the FETs Q1 and Q2 may be lower, and lower voltage-rated components can be used for the components.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A switching power supply device comprising:
    a transformer having primary and secondary windings;
    a first switch circuit;
    said primary winding of said transformer and said first switch circuit being connected in series and adapted to be connected in series with an input power source;
    a second switch circuit, said second switch circuit and a first capacitor being connected in series to form a series circuit, a first end of the series circuit being connected to one end of said first switch circuit;
    a rectifier smoothing circuit connected to the secondary winding of said transformer;
    said first switch circuit comprising a parallel connection circuit comprising a first switching device and a first diode;
    said second switch circuit comprising a parallel connection circuit comprising a second switching device and a second diode; and
    a switching control circuit for controlling each of the first and second switching devices so as to be alternately turned on and off before and after periods during which the first and second switching devices are both turned off;
    wherein said transformer further comprises a third winding wound in the same direction as that of the primary winding, and a capacitive impedance element is a–c connected between a termination of the third winding and said input power source.

2. The switching power supply device of claim 1, wherein the capacitive impedance element comprises a series circuit comprising a capacitor and an inductor.

3. The switching power supply device of claim 2, wherein the inductor comprises a ferrite bead.

4. The switching power supply device of claim 1, wherein a voltage generated at the third winding is used to turn on the second switching device.

5. The switching power supply device of claim 1, wherein at least one of the first and second switching devices comprises a field effect transistor.

6. The switching power supply device of claim 1, wherein said transformer includes a driving winding which provides a voltage to turn on the first switching device to provide self-excited oscillation.

7. The switching power supply device of claim 1, wherein a leakage inductance generated between the primary and secondary winding of said transformer and the first capacitor form a resonant circuit.

8. The switching power supply device of claim 1, wherein said rectifier smoothing circuit includes a diode for rectifying an output of the secondary winding, and a capacitive impedance element connected in parallel to said diode.

9. The switching power supply device of claim 1, wherein said rectifier smoothing circuit allows energy to be accumulated in the primary winding of said transformer while the first switching device is turned on, and allows the energy to be supplied from the secondary winding of said transformer while the first switching device is turned off.

10. The switching power supply device of claim 1, wherein the series circuit has a second end connected to said input power source.

11. The switching power supply device of claim 1, wherein the second switch circuit has a first end comprising the first end of the series circuit, and a second end connected to said input power source and the first capacitor is connected in series with said primary winding.

12. The switching power supply device of claim 11, further comprising an inductor disposed in series with said first capacitor.

13. The switching power supply device of claim 1, wherein the series circuit is disposed in parallel with the first switch circuit.

14. The switching power supply device of claim 10, wherein the inductor and the first capacitor form a resonant circuit.

15. The switching power supply device of claim 13, further comprising an inductor disposed in series with said first capacitor.

* * * * *